(12) United States Patent
Ji et al.

(10) Patent No.: US 11,118,000 B2
(45) Date of Patent: Sep. 14, 2021

(54) POLYURETHANE OR POLYURETHANE-UREA AQUEOUS DISPERSION, PREPARATION METHOD THEREFOR, AND USE THEREOF

(71) Applicants: WANHUA CHEMICAL GROUP CO., LTD., Yantai (CN); WANHUA CHEMICAL (GUANGDONG) CO., LTD., Zhuhai (CN)

(72) Inventors: Xueshun Ji, Shandong (CN); Yunquan Jin, Shandong (CN); Tianwen Zhou, Shandong (CN); Weiguo Zhao, Shandong (CN); Haimei Wang, Shandong (CN); Yunling Liu, Shandong (CN); Zhen Wang, Shandong (CN); Bin Zhang, Shandong (CN); Yuyang Cao, Shandong (CN); Jiakuan Sun, Shandong (CN)

(73) Assignees: WANHUA CHEMICAL GROUP CO., LTD., Yantai (CN); WANHUA CHEMICAL (GUANGDONG) CO., LTD., Zhuhai (CN)

(*) Notice: Subject to any disclaimer, the term of this patent is extended or adjusted under 35 U.S.C. 154(b) by 195 days.

(21) Appl. No.: 16/473,420

(22) PCT Filed: Dec. 30, 2016

(86) PCT No.: PCT/CN2016/113585
§ 371 (c)(1),
(2) Date: Jun. 25, 2019

(87) PCT Pub. No.: WO2018/120055
PCT Pub. Date: Jul. 5, 2018

(65) Prior Publication Data
US 2019/0322793 A1    Oct. 24, 2019

(30) Foreign Application Priority Data
Dec. 29, 2016 (CN) .......................... 201611240230.0

(51) Int. Cl.
| | | |
|---|---|---|
| *C08G 18/38* | (2006.01) | |
| *C08G 18/12* | (2006.01) | |
| *C08G 18/22* | (2006.01) | |
| *C08G 18/32* | (2006.01) | |
| *C08G 18/40* | (2006.01) | |
| *C08G 18/42* | (2006.01) | |
| *C08G 18/44* | (2006.01) | |
| *C08G 18/48* | (2006.01) | |
| *C08G 18/66* | (2006.01) | |
| *C08G 18/73* | (2006.01) | |
| *C08G 18/75* | (2006.01) | |
| *C08J 3/03* | (2006.01) | |
| *C09D 175/06* | (2006.01) | |
| *C09D 175/08* | (2006.01) | |
| *C09J 175/06* | (2006.01) | |
| *C09J 175/08* | (2006.01) | |

(52) U.S. Cl.
CPC ......... *C08G 18/3893* (2013.01); *C08G 18/12* (2013.01); *C08G 18/227* (2013.01); *C08G 18/3234* (2013.01); *C08G 18/3271* (2013.01); *C08G 18/3855* (2013.01); *C08G 18/4018* (2013.01); *C08G 18/4202* (2013.01); *C08G 18/4211* (2013.01); *C08G 18/4238* (2013.01); *C08G 18/44* (2013.01); *C08G 18/4833* (2013.01); *C08G 18/6622* (2013.01); *C08G 18/73* (2013.01); *C08G 18/755* (2013.01); *C08J 3/03* (2013.01); *C09D 175/06* (2013.01); *C09D 175/08* (2013.01); *C09J 175/06* (2013.01); *C09J 175/08* (2013.01); *C08J 2375/06* (2013.01); *C08J 2375/08* (2013.01)

(58) Field of Classification Search
CPC . C08G 18/3893; C08G 18/12; C08G 18/4202
See application file for complete search history.

(56) References Cited

U.S. PATENT DOCUMENTS

| | | | |
|---|---|---|---|
| 3,632,557 A | 1/1972 | Brode et al. | |
| 4,870,129 A | 9/1989 | Henning et al. | |
| 5,066,705 A | 11/1991 | Wickert | |
| 5,834,555 A | 11/1998 | Meisenburg et al. | |
| 6,730,807 B1 | 5/2004 | Häberle et al. | |
| 8,557,387 B2 | 10/2013 | Kraus et al. | |
| 2002/0056518 A1* | 5/2002 | Shah | C08G 18/12 156/331.4 |
| 2003/0045636 A1* | 3/2003 | Krebs | C08G 18/12 525/127 |

(Continued)

FOREIGN PATENT DOCUMENTS

| | | |
|---|---|---|
| CN | 1590429 A | 3/2005 |
| CN | 101381451 A | 3/2009 |

(Continued)

OTHER PUBLICATIONS

Espacenet Translation of JP 2005060690 A (Year: 2021).*

(Continued)

*Primary Examiner* — Michael M Dollinger
(74) *Attorney, Agent, or Firm* — Armstrong Teasdale LLP

(57) ABSTRACT

A self-crosslinkable polyurethane or polyurethane-urea aqueous dispersion, a preparation method therefor, and a use thereof. Side chains of the polyurethane or polyurethane-urea contain non-sterically-hindered siloxy groups. During the drying and activation of the aqueous dispersion, the siloxys in the side chains are hydrolyzed and crosslinked with each other to increase the cross-linking density, significantly improving the heat resistance, the humidity resistance, and other properties of an adhesive obtained therefrom. The aqueous dispersion itself has a good stability. In addition, an application system based thereon has an excellent stability and a long storage time. The aqueous dispersion is suitable for the preparation of high quality paints and sealants, especially adhesives.

20 Claims, No Drawings

(56) References Cited

U.S. PATENT DOCUMENTS

| | | |
|---|---|---|
| 2006/0237682 A1 | 10/2006 | Rische et al. |
| 2008/0236449 A1 | 10/2008 | Shi et al. |
| 2009/0056873 A1 | 3/2009 | Schumacher et al. |
| 2009/0312515 A1 | 12/2009 | Uchida et al. |
| 2011/0244228 A1 | 10/2011 | Blum et al. |
| 2013/0220543 A1* | 8/2013 | Buchner ............... C08G 18/12 156/331.7 |

FOREIGN PATENT DOCUMENTS

| | | | |
|---|---|---|---|
| CN | 101466754 A | 6/2009 | |
| CN | 101633828 A | 1/2010 | |
| CN | 101848954 A | 9/2010 | |
| CN | 102216359 A | 10/2011 | |
| CN | 102585650 A | 7/2012 | |
| CN | 102690404 A | 9/2012 | |
| CN | 103649143 A | 3/2014 | |
| CN | 104352359 A | 2/2015 | |
| CN | 105884999 A | 8/2016 | |
| CN | 106046316 A | 10/2016 | |
| DE | 1410557 A1 | 9/1995 | |
| DE | 19954500 A1 | 5/2001 | |
| EP | 0163214 A2 | 12/1985 | |
| EP | 792908 A1 | 9/1997 | |
| EP | 1272588 A1 | 1/2003 | |
| JP | 2001002746 A | 1/2001 | |
| WO | 0059975 A1 | 10/2000 | |
| WO | 2015183654 A1 | 12/2015 | |

OTHER PUBLICATIONS

First Search Report for CN Application No. 201611240230.0, dated Jun. 17, 2019, 3 pages.

First Office Action for CN Application No. 201611240230.0, dated Jun. 25, 2019, 7 pages.

Relationship between Molecular Structure and Bond Strength of Aqueous Polyurethane, Zhengjing, China Excellent Masters Degree Thesis Full-Text Database Engineering Technology Part I, (2014) No. 8, B016-346, published Aug. 15, 2014. Abstract.

Du, Y. et al. 2012. Synthesis of silane coupling agent modified high solid waterborne polyurethane. China Synthetic Resin and Plastics, Issue 1, pp. 16-20. Abstract.

International Search Report for International Application No. PCT/CN2016/113585, dated Aug. 30, 2017, 4 pages.

Office Action for corresponding BR Application No. BR112019013583-9, dated Mar. 3, 2020, 4 pages.

EP Extended Search Report for Application No. 16925084.2 dated Aug. 4, 2020; 9 pp.

* cited by examiner

POLYURETHANE OR POLYURETHANE-UREA AQUEOUS DISPERSION, PREPARATION METHOD THEREFOR, AND USE THEREOF

CROSS-REFERENCE TO RELATED APPLICATIONS

This application is a U.S. National Phase Application of PCT/CN2016/113585, filed Dec. 30, 2016, which claims the benefit of priority to CN Application No. 201611240230.0, filed Dec. 29, 2016, the contents of which are hereby expressly incorporated by reference in their entirety.

TECHNICAL FIELD

The present invention relates to a self-crosslinkable polyurethane or polyurethane-urea aqueous dispersion, a preparation method therefor and a use thereof.

BACKGROUND OF ART

Polyurethane or polyurethane-urea aqueous dispersions have been widely used in the fields of paints, sealants, and adhesives as they have good brushability, excellent initial tack and peel strength, and outstanding resistance. The polyurethane or polyurethane-urea aqueous dispersions are generally required to be activated in advance when being used in adhesives. Activation means that after the aqueous dispersion is coated on the substrate, the water is removed by heating, meanwhile, at the heating temperature, the activity of the polyurethane segment is increased, and the polyurethane or polyurethane-urea is converted into a viscoelastic state. Then operations such as adhesion are then performed.

In order to improve the properties of polyurethane adhesives, U.S. Pat. No. 4,870,129 discloses introducing hydroxys into a polyurethane or polyurethane-urea aqueous dispersion and then the polyurethane or the polyurethane-urea aqueous dispersion are used to be compounded with isocyanates to increase the cross-linking density by the reaction of isocyanates with hydroxys, and significantly increases the adhesive strength and heat resistance. However, in this manner, isocyanates react with water in advance in the process of preparing materials, painting, etc., resulting in a shorter construction time (generally several hours) of the adhesives.

The patents DE19954500, DE4410557 or EP792908 propose to introduce carboxylates into a polyurethane or a polyurethane-urea aqueous dispersion and then the polyurethane or the polyurethane-urea aqueous dispersion are compounded with a carbodiimide to improve adhesive properties, mainly, by using the reaction between the carboxylic acids and the carbodiimide, the cross-linking density is increased, and the strengths of adhesives are increased. In the patents, the carboxylates are obtained by adding dimethylolpropionic acid to a polyurethane or a polyurethane-urea and then neutralization with a tertiary amine. However, the reaction activity of carboxyls with carbodiimides in such kind of compounding schemes of adhesives is low, and the final properties are generally insufficient to meet the requirements for heat resistance of adhesives.

U.S. Pat. No. 5,066,705 describes the preparation of weather-resistant water-based paints for plastic substrates using carboxyl-containing polymers, carboxyl-containing polyurethanes and polycarbodiimides. However, the carboxyl-containing polymers and polyurethanes used in the patent all have very high acid values, which may cause the final coatings to have high hydrophilicities, be very likely to be influenced by water or other substances, degraded performances, and shortened service life periods. In addition, the carboxyls of the polyurethanes in the patent are introduced by using dimethylolpropionic acid or a carboxyl-containing polyester, and the carboxyls obtained by the two introduction methods all have larger steric hindrances and lower reaction activities with carbodiimide, the cross-linking density of the final coating is not high, and the performance improvement is not remarkable.

EP1272588 describes an adhesive composite comprising at least a crystalline polyester-polyurethane dispersion, a polyacrylate copolymer, a polychloroprene dispersion, a heat-curable resin and a stabilizer (amino alcohol, carbodiimide and magnesium oxide), in which the stabilizer used has a function of inhibiting the hydrolysis of the polyester in the system and maintaining the stability of the system. However, such a multi-component system is expensive and lose efficacy fast, which severely limits the use of the system in practical life.

CN102216359 describes a terminal carboxyl-containing polyurethane or polyurethane-urea aqueous dispersion is obtained by the addition of a monoaminocarboxylic acid or a monohydroxycarboxylic acid during the synthesis and then is compounded with a carbodiimide to prepare an adhesive. The terminal carboxyl can rapidly crosslink with carbodiimide due to the high activity of the carboxyl, thereby the coating performance are significantly improved.

However, the carboxylic acid affects the stability of the polyurethane or polyurethane-urea aqueous dispersion, while the carbodiimide itself is not stable, these are not conducive to the storage of such a system.

CN101381451 describes a self-crosslinkable aqueous polyurethane dispersion obtained by the addition of a sterically-hindered siloxane. Although the addition of a sterically-hindered siloxane structure can ensure the storage of a stable self-crosslinking dispersion, such an addition will also cause the cross-linking reaction during the use of the dispersion to be too slow to establish the desired properties. At the same time, the patent also states that dispersions prepared using non-sterically-hindered siloxane crosslinking monomers containing methoxyl or ethoxyl etc. do not have self-crosslinking properties because such dispersions cannot be stored while they are stable.

SUMMARY OF THE INVENTION

In view of the problems of the prior art described above, it is an object of the present invention to provide a self-crosslinkable polyurethane or polyurethane-urea aqueous dispersion, a preparation method therefor, and a use thereof. The side chains of the polyurethane or polyurethane-urea of the present invention contain non-sterically-hindered siloxy groups. During the drying and activation of the aqueous dispersion, the siloxys in the side chains are hydrolyzed and crosslinked with each other. The aqueous dispersion has good self-crosslinking performance and good stability itself.

In order to achieve an aspect of the above object, the present invention adopts the following technical solutions:

a polyurethane or polyurethane-urea aqueous dispersion, wherein the polyurethane or polyurethane-urea aqueous dispersion is a reaction product obtained by reacting a composition comprising the following components:

a) at least one siloxane component having a general formula of

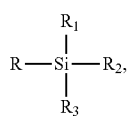

wherein group R contains at least two NCO-reactive groups, while at least two of groups $R_1$, $R_2$ and $R_3$ are methoxyls and/or ethoxyls, the rest of groups $R_1$, $R_2$ and $R_3$ is an alkyl;

b) at least one polyol component having a functionality of 2-4;

c) at least one polyisocyanate component;

d) at least one hydrophilic compound component, the hydrophilic group of the hydrophilic compound comprises one or two of an ionic group and a potentially ionic group, the hydrophilic compound contains 2-3 NCO-reactive groups;

e) at least one NCO-reactive, monofunctional nonionic hydrophilic compound component; and f) optionally, a compound containing 1-3 aminos and/or hydroxys in the molecule, wherein the number of the aminos is not less than 1;

g) optionally, other isocyanate-reactive compounds.

In the present invention, based on the total weight of the composition, the component a) is used in an amount of 0.02-5 wt %, preferably 0.2-2.5 wt %, such as 1 wt % or 2 wt %; the component b) is used in an amount of 30-94 wt %, preferably 70-90 wt %, such as 50 wt % or 80 wt %; the component c) is used in an amount of 5-40 wt %, preferably 8-20 wt %, such as 10 wt %, 15 wt % or 30 wt %; the component d) is used in an amount of 0.2-10 wt %, preferably 1-5 wt %, such as 3 wt % or 8 wt %; the component e) is used in an amount of 0.01-10 wt %, preferably 0.5-3 wt %, such as 1.5 wt % or 5 wt %; the component f) is used in an amount of 0-10 wt %, preferably 0.5-3 wt %, such as 1 wt %, 2 wt % or 5 wt %, a person skilled in the art understands that when the amount of component f) is zero, it means that the component is not included in the composition; the component g) is used in an amount of 0-15 wt %, preferably 1-8 wt %, such as 2 wt %, 5 wt % or 10 wt %, a person skilled in the art understands that when the amount of component g) is zero, it means that the component is not included in the composition.

In the present invention, component a), i.e., the siloxane component can add siloxys to the side chains of the polyurethane or polyurethane-urea, the groups have at least two NCO-reactive functional groups. The NCO-reactive functional group is preferably selected from one or more of hydroxy, primary aminos and secondary aminos; more preferably a primary amino and/or a secondary amino. Suitable examples of the component a) comprise but are not limited to N-β-(aminoethyl)-γ-aminopropyltrimethoxy silane, N-β-(aminoethyl)-γ-aminopropyltriethoxy silane and N-(β-aminoethyl)-γ-aminopropylmethyldimethoxy silane and so on.

In the present invention, component b) is preferably a polyol having a number average molecular weight of 20-15,000, more preferably one or more of a diol, a triol and a tetraol having a number average molecular weight of 80-5,000; more preferably one or more of polyester polyols such as polycarbonate polyols, polylactone polyols having a number average molecular weight of 500-5,000 and a functionality of 2-3 and small molecular alcohols having a number average molecular weight of 80-400 and a functionality of 2-4.

Suitable polyester polyol may be a linear polyester diol and/or a microbranched polyester diol (the microbranched polyester diol may also contain a small amount, for example less than 1 wt % of polyester polyol with a functionality greater than 3). The polyester polyol, for example, can be obtained by dehydration condensation of a carboxylic acid and/or an acid anhydride such as aliphatic, cycloaliphatic, aromatic dicarboxylic acid, or a polycarboxylic acid or its corresponding acid anhydride with a polyol by a known manner. Examples of carboxylic acid or acid anhydride for dehydration condensation comprise, but are not limited to succinic acid, methyl succinic acid, glutaric acid, adipic acid, pimelic acid, suberic acid, azelaic acid, sebacic acid, nonane dicarboxylic acid, decane dicarboxylic acid, terephthalic acid, isophthalic acid, phthalic acid, tetrahydrophthalic acid, hexahydrophthalic acid, cyclohexane dicarboxylic acid, maleic acid, fumaric acid, malonic acid, trimellitic acid, phthalic anhydride, trimellitic anhydride, succinic anhydride or a mixture thereof; the polyol for dehydration condensation is preferably a low molecular weight polyol (for example a polyol having a molecular weight not greater than 400), examples of such a polyol comprise, but are not limited to ethylene glycol, diethylene glycol, triethylene glycol, tetraethylene glycol, 1,2-propanediol, dipropylene glycol, tripropylene glycol, tetrapropylene glycol, 1,3-propanediol, 1,4-butanediol, 1,3-butanediol, 2,3-butanediol, 1,5-pentanediol, 1,6-hexanediol, 2,2-dimethyl-1,3-propanediol, 1,4-dihydroxycyclohexane, 1,4-dimethylolcylohexane, 1,8-octanediol, 1,10-decanediol, 1,12-dodecanediol or a mixture of more thereof. Optionally, a polyol having a higher functionality such as trimethylolpropane, glycerol or pentaerythritol may also be added during the dehydration condensation described above. Alicyclic, aromatic polyhydroxy compounds are also suitable to be used as polyols for the preparation of the polyester polyols.

Preferably, the polyester polyol is a polyester polyol obtained by dehydration condensation reaction of one or more of isophthalic acid, terephthalic acid and adipic acid with one or more of neopentyl glycol, ethylene glycol, butanediol and hexanediol.

The polyester polyol may also be a homopolymer or copolymer of a lactone, which can be obtained by ring-opening reaction of a lactone or a mixture of lactones with a suitable low molecular weight difunctional polyol and/or a higher functional polyol, wherein, the lactone is a butyrolactone, ε-caprolactone, methyl-ε-caprolactone or a mixture thereof, the polyol can be a low molecular weight polyol as a structural component of the polyester polyol as described above. Preferably a linear polyester polyol obtained by ring-opening of ε-caprolactone with 1,4-butanediol, 1,6-hexanediol, 2,2-dimethyl-1,3-propanediol or a mixture thereof.

A hydroxy-containing polycarbonate polyol hydroxy that is prepared by using a diol and a carbonate is also suitable to be used as component b), wherein the diol can be 1,4-butanediol or 1,6-hexanediol, the carbonate can be a diaryl carbonate or a dialkyl carbonate. The diaryl carbonate can be diphenyl carbonate, and the dialkyl carbonate can be dimethyl carbonate; preferably, the polycarbonate polyol is a polycarbonate polyol prepared by the reaction of 1,6-hexanediol and dimethyl carbonate.

The small molecular alcohol having a molecular weight of 80-400 in the component b) of the present invention has a functionality of 2-4, examples of suitable small molecular alcohols comprise but are not limited to ethylene glycol, diethylene glycol, triethylene glycol, tetraethylene glycol, 1,2-propanediol, dipropylene glycol, tripropylene glycol, tetrapropylene glycol, 1,3-propanediol, 1,4-butanediol, 1,3-butanediol, 2,3-butanediol, 1,5-pentanediol, 1,6-hexanediol, 2,2-dimethyl-1,3-propanediol (NPG), 1,4-dihydroxycyclohexane, 1,4-dimethylolcylohexane, 1,8-octanediol, 1,10-decanediol, 1,12-dodecanediol, neopentyl glycol, 1,4-cyclohexanediol, 1,4-cyclohexanedimethanol, 1,4-, 1,3-, 1,2-dihydroxybenzene or 2,2-bis-(4-hydroxyphenyl)propane (bisphenol A), trimethylolpropane, glycerin, pentaerythritol, dipentaerythritol or a mixture of more thereof, preferably one or more of 1,4-butanediol, 1,6-hexanediol and trimethylolpropane.

In another embodiment, component b) of the present invention is preferably a mixture of a crystalline polyol having a number average molecular weight of 400-15,000 and a non-crystalline polyol having a number average molecular weight of 400-15,000, particularly preferably a mixture of a crystalline diol having a number average molecular weight of 1,000-4,000 and a non-crystalline diol having a number average molecular weight of 1,000-4,000. Preferable non-crystalline diol is a polycarbonate diol. The crystalline glycol is preferably a copolymer of one or two of 1,4-butanediol and 1,6-hexanediol with adipic acid. The polycarbonate diol is preferably a copolymer of one or more of 1,4-butanediol, 1,5-pentanediol, 1,6-hexanediol and neopentyl glycol with dimethyl carbonate and/or diethyl carbonate. The weight ratio of the crystalline diol to the non-crystalline diol is preferably 1-25:1, more preferably 5-10:1, for example 2:1, 4:1, 8:1, 15:1 or 20:1.

The component c) polyisocyanate of the present invention is an organic compound having at least two isocyanate groups, preferably diisocyanate $Y(NCO)_2$, wherein Y represents a divalent aliphatic alkyl having 4-12 carbon atoms, a divalent alicyclic alkyl having 6-15 carbon atoms, a divalent aromatic alkyl having 6-15 carbon atoms or a divalent aromatic aliphatic alkyl having 7-15 carbon atoms. Suitable diisocyanate can be tetramethylene diisocyanate, methyl pentamethylene diisocyanate, hexamethylene diisocyanate, dodecamethylene diisocyanate, 1,4-cyclohexane diisocyanate, isophorone diisocyanate, 4,4'-dicyclohexylmethane diisocyanate, 4,4'-dicyclohexylpropane diisocyanate, 1,4-phenylene diisocyanate, 2,4-toluene diisocyanate, 2,6-toluene diisocyanate, 4,4'-diphenylmethane diisocyanate, 2,2'- and 2,4'-diphenylmethane diisocyanate, tetramethyldimethylphenyl diisocyanate, p-xylylene diisocyanate, p-isopropylidene diisocyanate or a mixture thereof.

In one embodiment, the diisocyanate in component c) is an aliphatic and/or alicyclic diisocyanate, such as hexamethylene diisocyanate, 1,4-cyclohexane diisocyanate, isophorone diisocyanate, 4,4'-dicyclohexylmethane diisocyanate and 4,4'-dicyclohexylpropane diisocyanate or a mixture thereof; more preferably, 1,4-cyclohexane diisocyanate, isophorone diisocyanate and 4,4'-dicyclohexylmethane diisocyanate or a mixture thereof; further preferably, a mixture of hexamethylene diisocyanate and isophorone diisocyanate, or a mixture of hexamethylene diisocyanate and 4,4'-dicyclohexylmethane diisocyanate, wherein the weight ratio of hexamethylene diisocyanate to isophorone diisocyanate is 1-50:1, preferably 3-10:1, for example 2:1, 5:1 or 20:1; the weight ratio of hexamethylene diisocyanate to 4,4'-dicyclohexylmethane diisocyanate is 1-50:1, preferably 3-10:1, for example 2:1, 5:1 or 20:1.

In another embodiment, component c) may also comprise a small amount (preferably no more than 10 wt % of the total amount of component c)) of polyisocyanate having a functionality of at least 3 isocyanate groups per molecule and is known in the art, for example, a polyisocyanate prepared by modification of simple aliphatic, cycloaliphatic, araliphatic and/or aromatic diisocyanate, a modified polyisocyanate synthesized from at least two diisocyanates (for example with a structure of uretdione, isocyanurate, carbamate, allophanate, biuret, carbodiimide, iminooxadiazinedione and/or oxadiazinetrione).

In the present invention, the potentially ionic group in component d) is well known to a person skilled in the art and refers to a functional group having a covalent bond, by adding a neutralizing agent, the group is easily converted to a corresponding salt as the pH of the solution changes. In the present invention, preferred potentially ionic groups comprise acid groups which are carboxyl (—COOH) and/or sulfonic group (—$SO_3H$); preferred NCO-reactive groups are hydroxy and/or amino.

Preferred ionic groups are carboxylate (—$COO^-$) and/or sulfonate (—$SO_3^-$).

Preferably, examples of component d) comprise, but are not limited to, one or more of dihydroxy carboxylic acid, trihydroxy carboxylic acid, dihydroxy sulfonic acid, trihydroxy sulfonic acid, diaminosulfonic acid, triaminosulfonic acid, diaminocarboxylic acid, triaminocarboxylic acid and salts thereof (alkali metal salts, alkaline earth metal salts and/or ammonium salts).

Particularly preferably, component d) is one or more selected from the group consisting of dimethylolpropionic acid, dimethylolbutanoic acid, dimethylol acetic acid, dihydroxysuccinic acid, N-(2-aminoethyl)-2-aminoethanesulfonic acid, N-(3-aminopropyl)-2-aminoethanesulfonic acid, N-(3-aminopropyl)-3-aminopropanesulfonic acid, N-(2-aminoethyl)-3-aminopropanesulfonic acid and the salts thereof, and/or one or more of Michael addition products formed by adding one or more of acrylic acid, methacrylic acid, maleic acid and fumaric acid to an amine (for example, isophoronediamine, butanediamine, ethylenediamine or 1,6-hexanediamine).

If component d) contains potentially ionic groups, preferably, a neutralizing agent can be added before, during or after adding component d) to the composition. The amount of the added neutralizing agent is such that part or all of the potentially ionic groups become ionic groups. Suitable neutralizing agents are, for example, one or more of primary amines, secondary amines, tertiary amines, alkali metal compounds, and alkaline earth metal compounds. Examples of suitable neutralizing agents comprise, but are not limited to, one or more of ammonia, ethanolamine, diethanolamine, triethanolamine, dimethylethanolamine, 2-amino-2-methyl-1-propanol, morpholine, N-methylmorpholine, dimethysopropylamine, N-methyldiethanolamine, triethylamine, dimethylcyclohexylamine, ethyldiisopropylamine, sodium hydroxide, potassium hydroxide, lithium hydroxide and calcium hydroxide.

In general, the amount of the added neutralizing agent is such that the degree of neutralization is at least 50%, preferably at least 75%, and no more than 150%, based on the total molar amount of the introduced acid groups. Those skilled in the art understand that when the degree of neutralization exceeds 100%, in addition that 100% of the acid groups are neutralized and form ionic groups, a free neutralizing agent is also present. It is particularly preferable that the degree of neutralization is 95-110%, wherein, the degree of neutralization=(the amount of the neutralized acid groups+the amount of the free neutralizing agent)/the total amount of the introduced acid groups, in the equation, the term "amount" refers to a molar amount, and when the amount of the neutralized acid groups is not larger than the total amount of the introduced acid groups, the amount of the free neutralizing agent is zero.

More preferably, component d) is N-(2-aminoethyl)-2-aminoethanesulfonate and/or dimethylolpropionate.

Component e) of the present invention is a NCO-reactive, monofunctional nonionic hydrophilic compound component, preferably a polyoxyalkylene ether comprising a hydroxy or an amino. Examples of the initiators for preparing the polyoxyalkylene ether comprise, but are not limited to, a saturated monohydric alcohol, an unsaturated alcohol, an aromatic alcohol, an aromatic-aliphatic alcohol, a secondary monoamine, and a heterocyclic secondary amine, wherein the saturated monohydric alcohol can be methanol, ethanol, n-propanol, isopropanol, n-butanol, isobutanol, sec-butanol, isomeric pentanol, hexanol, octanol, nonanol, n-decanol, n-dodecanol, n-tetradecanol, n-hexadecanol, cyclohexanol, or hydroxymethylcyclohexane; the unsaturated alcohol can be allyl alcohol, 1,1-dimethyl-allyl alcohol or oleyl alcohol; the aromatic alcohol can be phenol, isomeric cresol or methylol phenol; the aromatic-aliphatic alcohol can be benzyl alcohol, anisyl alcohol or cinnamyl alcohol; the secondary monoamine can be dimethylamine, diethylamine, dipropylamine, diisopropylamine, di-n-butylamine, diisobutylamine, bis(2-ethylhexyl)-amine, N-methylcyclohexylamine, N-methyl dicyclohexylamine, N-ethylcyclohexylamine or N-ethyldicyclohexylamine; the heterocyclic secondary amine can be morpholine, pyrrolidine or piperidine-ethyl-pyrazole etc.; preferred initiator is a saturated monohydric alcohol having up to 4 carbon atoms, methanol is particularly preferred as the initiator. The polymerization unit of the polyoxyalkylene ether is propylene oxide and/or ethylene oxide, preferably ethylene oxide. The ethylene oxide number per molecule is 4-200, preferably 12-75, for example 10, 20 or 50.

The component e) of the present invention is preferably a monofunctional polyethoxy ether having a number average molecular weight of 200-8,000 and an ethylene oxide number of 4-200, more preferably a methoxy polyethylene glycol having a number average molecular weight of 500-3,000 and an ethylene oxide number of 12-75.

The component f) of the present invention is a compound containing 1-3, preferably 2-3 NCO-reactive functional groups, wherein at least one of the NCO-reactive functional groups is an amino. The NCO-reactive functional group can be one or more of a hydroxy, a primary amino, and a secondary amino. The component f) can be an aliphatic or alicyclic primary monoamine or secondary monoamine such as ethylamine, diethylamine, isopropylamine and butylamine, or an amino alcohol, i.e. a compound containing amino and hydroxy in the molecule, such as ethanolamine, N-methylethanolamine, diethanolamine, diisopropanolamine, 1,3-diamino-2-propanol, N-(2-hydroxyethyl)ethylenediamine, N,N-bis(2-hydroxyethyl)ethylenediamine and 2-propanolamine, or a diamine and a triamine, such as 1,2-ethylenediamine, 1,6-hexamethylenediamine, 1-amino-3,3,5-trimethyl-5-aminomethylcyclohexane (isophoronediamine), piperazine, 1,4-diaminocyclohexane, bis-(4-aminocyclohexyl)methane and diethylenetriamine, or a special amine such as adipic acid dihydrazide, hydrazine. It is also possible to use a mixture of two or more of the above compounds.

Component f) can act as a chain extender to achieve a higher molecular weight and/or act as a monofunctional compound to limit molecular weight and/or optionally also introduce other reactive groups, such as free hydroxys, as other crosslinking points.

The component f) of the present invention is preferably isophoronediamine, N-(2-hydroxyethyl)ethylenediamine, 1,6-hexamethylenediamine or a mixture thereof.

The component f) of the present invention is more preferably a mixture of isophoronediamine and N-(2-hydroxyethyl)ethylenediamine with a molar ratio of 0.5-10:1, preferably 1-5:1, such as 2:1 or 4:1.

The component g) of the present invention can be a common blocking agent in the art or an unsaturated compound containing a polymeric reactive group; the blocking agent can be removed by heating at a higher temperature, preferably one or more of butanoneoxime, dimethylpyrazole, caprolactam, malonate, triazole, dimethyltriazole, tert-butyl benzylamine and cyclopentanone carboxyethyl ester; the unsaturated compound containing a polymeric reactive group is preferably one or more of hydroxyethyl acrylate, hydroxyethyl methacrylate, hydroxybutyl acrylate, hydroxybutyl methacrylate, hydroxypropyl acrylate, hydroxypropyl methacrylate, pentaerythritol triacrylate and a product obtained by reacting a monoepoxide, a diepoxide and/or a polyepoxide with a hydroxy functional group of acrylic acid or methacrylic acid, wherein the polyepoxide refers to an oxide having three or more rings.

In the present invention, the polyurethane or polyurethane-urea aqueous dispersion preferably has a solid content of 15-70 wt %, more preferably 30-60 wt %, such as 20 wt %, 40 wt % or 50 wt %; the pH of the dispersion is preferably 4-11, more preferably 5-10, such as 6 or 8; the average particle size of the solid phase particles in the system is preferably 20-750 nm, more preferably 50-450 nm, for example, 100 nm, 200 nm or 300 nm.

The present invention also provides a preparation method for the above polyurethane or polyurethane-urea aqueous dispersion, wherein components b), c), d), e) and optionally g) react through a one-step or multi-step reaction to form a prepolymer with a terminal isocyanate, then the prepolymer reacts with component a) and optional f) simultaneously or separately, followed by water dispersion to give an aqueous dispersion (dispersed phase), wherein a solvent which can be partially or completely removed by distillation during or after the dispersion is optionally added.

The preparation of the polyurethane or polyurethane-urea aqueous dispersion according to the present invention can be carried out in homogeneous phase in one or more stages, or can be carried out partially in the dispersed phase in the case of multi-stage reactions. The complete or partial polymerization reaction is followed by a dispersion, emulsification or dissolution step. Optionally, a step of addition polymerization or modification in the dispersed phase can be further included.

All methods known from the prior art, such as emulsifier shear dispersion method, acetone method, prepolymer mixing method, melt emulsification method, ketimine method and solid spontaneous dispersion method or methods derived from the above methods can be used in the preparation of the above polyurethane or polyurethane-urea aqueous dispersion. A summary of these methods can be found in Methoden der organischenChemie (Houben-Weyl, Erweiterungs-und Folgebände zur 4. Auflage, Vol. E20, H. Bartl and J. Falbe, Stuttgart, N.Y., Thieme 1987, pages 1671-1682); the melt emulsification method, prepolymer mixing method, and acetone method are preferred; the acetone method is especially preferred.

In one embodiment, components b), d), e) and c) are quantitatively mixed and then polymerized at a certain temperature to form a polyurethane prepolymer with a terminal isocyanate, the polyurethane prepolymer is then subjected to a chain extension reaction with component f), and then dispersed in water to give an polyurethane or polyurethane-urea aqueous dispersion, wherein component a) can be added at any stage.

In one embodiment, the polymerization is carried out by placing all or part of components b), d), e) and optionally g) into the reactor in advance, optionally diluted by a solvent which is inert to isocyanate groups and is water-miscible, and then component c) is metrically added at a temperature between room temperature and 120° C. to obtain a polyurethane prepolymer with a terminal isocyanate. This reaction can be carried out in a single stage or multiple stages. The multi-stage reaction can be carried out as follows: placing components b), d), optionally e) in advance and adding a second component g) after the reaction with the isocyanate functional component c), then react with some of the isocyanate groups still present, component a) can be added at any stage.

A suitable solvent can be acetone, methyl isobutyl ketone, butanone, tetrahydrofuran, dioxane, acetonitrile, dipropylene glycol dimethyl ether, 1-methyl-2-pyrrolidone, etc., which can be added not only at the beginning of the preparation and but also during or after the reaction. The solvent can also be added in batches. Acetone and butanone are preferred, and acetone is more preferred.

The ratio of the molar amount of the isocyanate groups to the sum of the molar amounts of the hydroxy and the amino used to prepare the polyurethane or polyurethane-urea aqueous dispersion of the present invention is 0.7-2.5:1, preferably 1.0-1.85:1, such as 1.5:1.

Typically, by tracking the NCO content of the reaction mixture, the conversion rate thereof is typically monitored. For this, a spectroscopic measurement (for example, the determination of an infrared or a near-infrared spectrum, refractive index) and a chemical potentiometric titration (for example, the chemical titration of the taken samples) can be carried out, preferably a chemical potentiometric titration is carried out.

The conventional catalyst used in the preparation may be a catalyst for accelerating the reaction of NCO with OH known to a person skilled in the art, such as triethylamine, 1,4-diazabicyclo-[2,2,2]-octane, dibutyl tin oxide, tin dioctoate or dibutyltin dilaurate, bis-(2-ethylhexanoate) tin, bismuth neodecanoate, bismuth 2-ethylhexanoate, and the like. Preferably bismuth neodecanoate, bismuth 2-ethylhexanoate, more preferably bismuth neodecanoate.

The chain extension reaction is usually carried out at a temperature of 10-100° C., preferably 25-60° C.

The optionally used organic solvent, such as acetone, is distilled off during and/or after dispersion.

The preferred preparation method is described as follows:

Components b), d), e), c) and an optional solvent are added in advance and heated to 50-100° C. while stirring. Using an exothermic reaction, the reaction mixture is stirred at 40-150° C. until the mixture has a isocyanate content that has reached or slightly lower than the theoretical isocyanate content (for example, 97 wt % or more, preferably 99 wt % or more of the theoretical content has been reached), the optional component g) is added and the reaction is continued until the mixture has a isocyanate content that has reached or slightly lower than the theoretical isocyanate content (for example 98 wt % or more, preferably 99 wt % or more of the theoretical content has been reached). Then, by adding a solvent, the mixture is diluted to a 25-95 wt %, preferably 40-80 wt % solid content. Then, component a) that is diluted with a solvent and optional component f) are added at 10-100° C., preferably 25-60° C. respectively for chain extension. After a reaction time of 2-60 minutes, the dispersion is carried out by adding distilled water or by transferring the mixture to preadded distilled water and distilling off the used solvent completely or partially during or after the dispersion step. Optionally, a catalyst can be added for the polymerization reaction.

The polyurethane or polyurethane-urea according to the present invention has pendant non-sterically-hindered siloxy segments. The aqueous dispersion can be stored while they are stable. During drying and activation, the pendant siloxys are rapidly hydrolyzed and crosslinked with each other to increase the cross-linking density, and significantly improve the properties such as heat resistance and humidity resistance of the adhesive.

Besides the pendant siloxy segments, the polyurethane or polyurethane-urea according to the present invention further has sulfonate and/or carboxylate groups and/or polyethoxy segments, and terminal polyethoxy segments. Different from the introduction of polyethoxy segments in the main chain or side chains, after the introduction of polyethoxy segments at the terminals, the terminal polyethoxy segment, in addition to be a hydrophilic group, the group is also advantageous for controlling the molecular weight of the polyurethane or polyurethane-urea to make the adhesive obtain the appropriate properties, which is more important.

Compared with the existing aqueous polyurethane-polyureas, the aqueous dispersion of the present invention, when used as an adhesive, has good initial heat resistance, late heat resistance, and resistance to hydrolysis under heat and humidity.

A crosslinking agent such as isocyanate or carbodiimide need to be added before using existing aqueous polyurethane-polyurea dispersions, and the crosslinking agent and the aqueous polyurethane-polyurea need to be mixed according to the ratio before construction, the operation is complicated, and the prepared glues must be used within a schedule time, then a short time is allowed before using. The aqueous dispersion of the present invention can meet the performance requirements without additional addition of a crosslinking agent such as isocyanate or carbodiimide, and can be used as an one-component product, the operation is simple, then a long time is allowed before using, and the construction efficiency is greatly increased.

The amount of siloxane added to the aqueous dispersion according to the present invention is small, and the aqueous dispersion itself is stable. The compounded system based on the aqueous dispersion has good stability and long storage time. The aqueous dispersion is suitable for the preparation of high quality paints, sealants, especially adhesives.

The polyurethane or polyurethane-urea aqueous dispersions prepared in accordance with the present invention can be used alone or in combination with auxiliary substances and additives known in arts of coatings and adhesives. For example, emulsifiers, light stabilizers (such as UV absorbers and sterically-hindered amines (HALS)), as well as antioxidants, fillers, anti-settling agents, defoaming and/or wetting agents, flow regulators, reactive diluents, plasticizers, neutralizers, catalysts, auxiliary solvents, thickeners, pigments, dyes, delustering agents, tackifiers and the like. The additives and/or auxiliary agents can be added before/after the polymerization, or may be added after the dispersion.

The polyurethane or polyurethane-urea aqueous dispersions prepared according to the present invention can also be used in a mixture with other water-containing or solvent-containing oligomers or polymers. For example, polyvinyl ester, polyvinyl ether, polyvinyl alcohol, polyethylene, polystyrene, polybutadiene, polyvinyl chloride, polyurethane, polyurethane-polyurea, polyurethane-polyacrylate, polyester, polyacrylate and/or copolymer dispersions or emulsions or aqueous solutions or organic solutions. The compatibilities of such mixtures in each case must be tested by using a simple preliminary test.

The polyurethane or polyurethane-urea aqueous dispersions prepared according to the present invention and the adhesive or binder composition based on the polyurethane or polyurethane-urea aqueous dispersions are suitable for bonding any substrate, such as all types of metals, alloys, wood, wood-based materials, particleboards, MDF boards, ceramic, stones, concrete, asphalt, hard fibers, glass, fiberglass, carbon fiber, carbon nanotubes, porcelain, plastics, leather, textiles and inorganic materials. They are also suitable for bonding rubber materials such as natural and synthetic rubbers, various plastics such as polyurethane, polyvinyl acetate, polyvinyl chloride, especially plasticizer-containing polyvinyl chloride. They are also suitable for thermoplastics such as ABS (acrylic-butadiene-styrene), PC (polycarbonate), polyolefin plastics and mixtures thereof.

Adhesives based on the polyurethane or polyurethane-urea aqueous dispersions prepared according to the present invention are also suitable for bonding soles made of these materials, in particular soles based on polyvinyl chloride, more particularly soles based on plasticizer-containing polyvinyl chloride, soles based on polyethylene vinyl acetate or polyurethane elastomer foam, uppers made of leather or artificial leather; also particularly suitable for bonding polyvinyl chloride based or plasticizer-containing polyvinyl chloride membrane with wood.

Coating agents, adhesives and/or sealants based on the aqueous dispersions of the present invention prepared by techniques known in the coating or adhesive techniques can be used in these fields.

At the same time, the preparation method of the self-crosslinking polyurethane or polyurethane-urea aqueous dispersion of the present invention is simple and easy to operate.

EMBODIMENTS

The method provided by the present invention is further described in detail below, but the present invention is not limited thereby.

The chemical reagents used in the following examples are analytical reagents;

Materials used:

Polyester I: a polyester diol prepared from adipic acid and 1,4-butanediol, OH value=56 mg KOH/g Polyester II: a polyester diol prepared from 1,6-hexanediol, neopentyl glycol and adipic acid, OH value=74 mg KOH/g Polyester III: a polyester diol prepared from adipic acid and 1,4-butanediol, OH value=112 mg KOH/g Polyester IV: a polyester diol prepared from phthalic acid and 1,6-hexanediol, OH value=56 mg KOH/g Polyester V: polycarbonate diol (PCDL T5652, Asahi Kasei Corporation), OH value=56 mg KOH/g Isocyanate I: hexamethylene diisocyanate (Wannate® HDI, Wanhua Chemical)

Isocyanate II: isophorone diisocyanate (Wannate® IPDI, Wanhua Chemical)

Polyether I: a monofunctional polyethoxy ether with an average molecular weight of 1200 g/mol (MPEG 1200, LG Chemical)

Polyether II: a monofunctional polyethoxy ether with an average molecular weight of 520 g/mol (MPEG520, LG Chemical)

EXAMPLE 1

210 g of dehydrated polyester I, 28.35 g of isocyanate I, 2 g of dehydrated polyether I, 23 g of acetone, and 0.04 g of bismuth neodecanoate were added to a 1 L four-necked round bottom flask equipped with a nitrogen inlet and a nitrogen outlet. The mixture was stirred at 80-90° C. until the NCO reached 2.00%. The prepolymer was dissolved in 400 g of acetone and cooled to 50° C. 4.63 g of sodium N-(2-aminoethyl)-2-aminoethanesulfonate, 3.26 g of isophoronediamine and 0.86 g of hydroxyethylethylenediamine dissolved in 35 g of aqueous solution, and 0.5 g of N-β-(aminoethyl)-γ-aminopropyltrimethoxysilane dissolved in 5 g of acetone were respectively added to the acetone solution in which the prepolymer was dissolved, and the solution was vigorously stirred at the same time. Stirred for 20 minutes and then dispersed the mixture by adding 238 g of water. 4 g of emulsifier Tween 20 was added after separating the acetone by distillation. A solvent-free polyurethane-polyurea aqueous dispersion was obtained, which has a solid content of 50 wt % and an average particle size of 180 nm as determined by laser-related measurements (laser particle size analyzer) in the dispersed phase, and a pH of 7.5.

EXAMPLE 2

150 g of dehydrated polyester I, 60 g of dehydrated polyester II, 28.5 g of isocyanate I, 24 g of acetone, 0.04 g of bismuth neodecanoate, 3.15 g of polyether II were added to a 1 L four-necked round bottom flask equipped with a nitrogen inlet and a nitrogen outlet. The mixture was stirred at 80-90° C. until the NCO reached 1.95%. The prepolymer was dissolved in 405 g of acetone and cooled to 50° C. 2 g of sodium N-(2-aminoethyl)-2-aminoethanesulfonate, 3.42 g of isophoronediamine and 0.41 g of hydroxyethylethylenediamine dissolved in 10 g of aqueous solution, and 2.39 g of N-β-(aminoethyl)-γ-aminopropyltrimethoxysilane dissolved in 20 g of acetone solution were respectively added to the acetone solution in which the prepolymer was dissolved, and the solution was vigorously stirred at the same time. Stirred for 20 minutes and then dispersed the mixture by adding 197 g of water. 4 g of emulsifier Tween 20 was added after separating the acetone by distillation. A solvent-free polyurethane-polyurea aqueous dispersion was obtained, which has a solid content of 55 wt % and an average particle size of 220 nm as determined by laser-related measurements in the dispersed phase, and a pH of 7.2.

EXAMPLE 3

80 g of dehydrated polyester I, 25 g of dehydrated polyester III, 20 g of dehydrated polyester IV, 12 g of dehydrated polyether I, 22 g of isocyanate I, 18 g of acetone, 0.04 g of bismuth neodecanoate were added to a 1 L four-necked round bottom flask equipped with a nitrogen inlet and a nitrogen outlet. The mixture was stirred at 80-90° C. until the NCO reached 2.1%. The prepolymer was dissolved in 309 g of acetone and cooled to 50° C. 4.6 g of sodium N-(2-aminoethyl)-2-aminoethanesulfonate, 1.8 g of isophoronediamine and 1 g of hydroxyethylethylenediamine dissolved in 35 g of aqueous solution, and 0.5 g of N-β-(aminoethyl)-γ-aminopropyltrimethoxysilane dissolved in 5 g of acetone solution were respectively added to the acetone solution in which the prepolymer was dissolved, and the solution was vigorously stirred at the same time. Stirred for 20 minutes and then dispersed the mixture by adding 224 g of water. 4 g of emulsifier Tween 20 was added after separating the acetone by distillation. A solvent-free polyurethane-polyurea aqueous dispersion was obtained, which has a solid content of 45 wt % and an average particle size of 150 nm as determined by laser-related measurements in the dispersed phase, and a pH of 7.5.

EXAMPLE 4

80 g of dehydrated polyester I, 110 g of dehydrated polyester II, 35 g of dehydrated polyester III, 28.35 g of isocyanate I, 2 g of dehydrated polyether I, 25 g of acetone, 0.04 g of bismuth neodecanoate were added to a 1 L four-necked round bottom flask equipped with a nitrogen inlet and a nitrogen outlet. The mixture was stirred at 80-90° C. until the NCO reached 2.00%. The prepolymer was dissolved in 405 g of acetone and cooled to 50° C. 5 g of sodium N-(2-aminoethyl)-2-aminoethanesulfonate, 3 g of isophoronediamine and 0.86 g of hydroxyethylethylenediamine dissolved in 35 g of aqueous solution, and 0.72 g of N-β-(aminoethyl)-γ-aminopropyltrimethoxysilane dissolved in 5 g of acetone solution were respectively added to the acetone solution in which the prepolymer was dissolved, and the solution was vigorously stirred at the same time. Stirred for 20 minutes and then dispersed the mixture by adding 238 g of water. 4 g of emulsifier Tween 20 was added after separating the acetone by distillation. A solvent-free polyurethane-polyurea aqueous dispersion was obtained, which has a solid content of 50 wt % and an average particle size of 180 nm as determined by laser-related measurements in the dispersed phase, and a pH of 7.5.

EXAMPLE 5

150 g of dehydrated polyester I, 120 g of dehydrated polyester II, 28.35 g of isocyanate I, 2 g of dehydrated polyether I were added to a 1 L four-necked round bottom flask equipped with a nitrogen inlet and a nitrogen outlet. The mixture was stirred at 80-90° C. until the NCO reached 2.19%. The prepolymer was dissolved in 424 g of acetone and cooled to 50° C. 5 g of sodium N-(2-aminoethyl)-2-aminoethanesulfonate, 3 g of isophoronediamine and 0.86 g of hydroxyethylethylenediamine dissolved in 35 g of aqueous solution dissolved, and 0.6 g of N-β-(aminoethyl)-γ-aminopropyltrimethoxysilane dissolved in 5 g of acetone solution were respectively added to the acetone solution in which the prepolymer was dissolved, and the solution was vigorously stirred at the same time. Stirred for 20 minutes and then dispersed the mixture by adding 558 g of water. 4 g of emulsifier Tween 20 was added after separating the acetone by distillation. A solvent-free polyurethane-polyurea aqueous dispersion was obtained, which has a solid content of 30 wt % and an average particle size of 64 nm as determined by laser-related measurements in the dispersed phase, and a pH of 6.8.

EXAMPLE 6

210 g of dehydrated polyester I, 43 g of isocyanate I, 2 g of dehydrated polyether I were added to a 1 L four-necked round bottom flask equipped with a nitrogen inlet and a nitrogen outlet. The mixture was stirred at 80-90° C. until the NCO reached 4.98%, then 15.2 g of butanone oxime was added at 50° C. until the NCO was lowered to 2.20%. The prepolymer was dissolved in 450 g of acetone and cooled to 50° C. 5 g of sodium N-(2-aminoethyl)-2-aminoethanesulfonate, 3 g of isophoronediamine and 0.86 g of hydroxyethylethylenediamine dissolved in 35 g of aqueous solution, and 0.58 g of N-β-(aminoethyl)-γ-aminopropyltrimethoxysilane dissolved in 5 g of acetone solution were respectively added to the acetone solution in which the prepolymer was dissolved, and the solution was vigorously stirred at the same time. Stirred for 20 minutes and then dispersed the mixture by adding 253 g of water. 4 g of emulsifier Tween 20 was added after separating the acetone by distillation. A solvent-free polyurethane-polyurea aqueous dispersion was obtained, which has a solid content of 50 wt % and an average particle size of 180 nm as determined by laser-related measurements in the dispersed phase, and a pH of 7.8.

EXAMPLE 7

210 g of dehydrated polyester I, 20 g of isocyanate I, 11.1 g of isocyanate II, 2 g of dehydrated polyether I, 24 g of acetone, 0.04 g of bismuth neodecanoate were added to a 1 L four-necked round bottom flask equipped with a nitrogen inlet and a nitrogen outlet. The mixture was stirred at 80-90° C. until the NCO reached 1.95%. The prepolymer was dissolved in 405 g of acetone and cooled to 50° C. 4.8 g of sodium N-(2-aminoethyl)-2-aminoethanesulfonate, 3.26 g of isophoronediamine and 0.86 g of hydroxyethylethylenediamine were dissolved in 35 g of aqueous solution, and 0.5 g of N-β-(aminoethyl)-γ-aminopropyltrimethoxysilane dissolved in 5 g of acetone solution were respectively added to the acetone solution in which the prepolymer was dissolved, and the solution was vigorously stirred. Stirred for 20 minutes and then dispersed the mixture by adding 241 g of water. 4 g of emulsifier Tween 20 was added after separating the acetone by distillation. A solvent-free polyurethane-polyurea aqueous dispersion was obtained, which has a solid content of 50 wt % and an average particle size of 176 nm as determined by laser-related measurements in the dispersed phase, and a pH of 8.

EXAMPLE 8

210 g of dehydrated polyester I, 35 g of isocyanate I, 5.8 g of dimethylolpropionic acid, 2 g of dehydrated polyether I, 24 g of acetone, 0.04 g of bismuth neodecanoate were added to a 1 L four-necked round bottom flask equipped with n nitrogen inlet and a nitrogen outlet. The mixture was stirred at 80-90° C. until the NCO reached 2.09%. The prepolymer was dissolved in 419 g of acetone and cooled to 50° C., and then 4.4 g of triethylamine was added for 5 minutes of neutralization. 2 g of isophoronediamine and 0.86 g of hydroxyethylethylenediamine dissolved in 35 g of aqueous solution, and 6 g of N-β-(aminoethyl)-γ-aminopropyltrimethoxysilane dissolved in 50 g of acetone solution were respectively added to the acetone solution in which the prepolymer was dissolved, and the solution was vigorously stirred at the same time. Stirred for 20 minutes and then dispersed the mixture by adding 300 g of water. 4 g of emulsifier Tween 20 was added after separating the acetone by distillation. A solvent-free polyurethane-polyurea aqueous dispersion was obtained, which has a solid content of 40 wt % and an average particle size of 195 nm as determined by laser-related measurements in the dispersed phase, and a pH of 7.5.

EXAMPLE 9

210 g of dehydrated polyester I, 32 g of isocyanate I, 4 g of 1,4-butanediol, 2 g of dehydrated polyether I, 24 g of acetone, 0.04 g of bismuth neodecanoate were added to a 1 L four-necked round bottom flask equipped with a nitrogen inlet and a nitrogen outlet. The mixture was stirred at 80-90° C. until the NCO reached 1.92%. The prepolymer was dissolved in 413 g of acetone and cooled to 50° C. 4.63 g of sodium N-(2-aminoethyl)-2-aminoethanesulfonate, 2.4 g of isophoronediamine, 0.86 g of hydroxyethylethylenediamine dissolved in 35 g of aqueous solution, and 1.5 g of N-β-(aminoethyl)-γ-aminopropyltrimethoxysilane dissolved in 50 g of acetone solution were respectively added to the acetone solution in which the prepolymer was dissolved, and the solution was vigorously stirred at the same time. Stirred for 20 minutes and then dispersed the mixture by adding 300 g of water. 4 g of emulsifier Tween 20 was added after separating the acetone by distillation. A solvent-free polyurethane-polyurea aqueous dispersion was obtained, which has a solid content of 40 wt % and an average particle size of 195 nm as determined by laser-related measurements in the dispersed phase, and a pH of 7.5.

EXAMPLE 10

190 g of dehydrated polyester I, 12 g of dehydrated polyester V, 20 g of isocyanate I, 11 g of isocyanate II, 2 g of dehydrated polyether I, 23 g of acetone, 0.04 g of bismuth neodecanoate were added to a 1 L four-necked round bottom flask equipped with a nitrogen inlet and a nitrogen outlet. The mixture was stirred at 80-90° C. until the NCO reached 2.15%. The prepolymer was dissolved in 400 g of acetone and cooled to 50° C. 4.63 g of sodium N-(2-aminoethyl)-2-aminoethanesulfonate, 3.26 g of isophoronediamine, 0.86 g of hydroxyethylethylenediamine dissolved in 35 g of aqueous solution, and 0.5 g of N-β-(aminoethyl)-γ-aminopropyltrimethoxysilane dissolved in 5 g of acetone solution were respectively added to the acetone solution in which the prepolymer was dissolved, and the solution was vigorously stirred. Stirred for 20 minutes and then dispersed the mixture by adding 238 g of water. 4 g of emulsifier Tween 20 was added after separating the acetone by distillation. A solvent-free polyurethane-polyurea aqueous dispersion was obtained, which has a solid content of 50 wt % and an average particle size of 165 nm as determined by laser-related measurements in the dispersed phase, and a pH of 7.0.

EXAMPLE 11

190 g of dehydrated polyester I, 20 g of dehydrated polyester V, 20 g of isocyanate I, 13 g of isocyanate II, 2 g of dehydrated polyether I, 23 g of acetone, 0.04 g of bismuth neodecanoate were added to a 1 L four-necked round bottom flask equipped with a nitrogen inlet and a nitrogen outlet. The mixture was stirred at 80-90° C. until the NCO reached 2.05%. The prepolymer was dissolved in 400 g of acetone and cooled to 50° C. 4.63 g of sodium N-(2-aminoethyl)-2-aminoethanesulfonate, 3.26 g of isophoronediamine, 0.86 g of hydroxyethylethylenediamine dissolved in 35 g of aqueous solution, and 0.5 g of N-β-(aminoethyl)-γ-aminopropyltrimethoxysilane dissolved in 5 g of acetone solution were respectively added to the acetone solution in which the prepolymer was dissolved, and the solution was vigorously stirred at the same time. Stirred for 20 minutes and then dispersed the mixture by adding 238 g of water. 4 g of emulsifier Tween 20 was added after separating the acetone by distillation. A solvent-free polyurethane-polyurea aqueous dispersion was obtained, which has a solid content of 50 wt % and an average particle size of 178 nm as determined by laser-related measurements in the dispersed phase, and a pH of 6.8.

EXAMPLE 12

80 g of dehydrated polyester I, 120 g of dehydrated polyester II, 30 g of dehydrated polyester III, 28.35 g of isocyanate I, 2 g of dehydrated polyether I, 25 g of acetone, 0.04 g of bismuth neodecanoate were added to a 1 L four-necked round bottom flask equipped with a nitrogen inlet and a nitrogen outlet. The mixture was stirred at 80-90° C. until the NCO reached 1.92%. The prepolymer was dissolved in 395 g of acetone and cooled to 50° C. 5 g of sodium N-(2-aminoethyl)-2-aminoethanesulfonate, 3 g of isophoronediamine, 0.86 g of hydroxyethylethylenediamine dissolved in 35 g of aqueous solution, and 0.72 g of N-β-(aminoethyl)-γ-aminopropyltrimethoxysilane dissolved in 5 g of acetone solution were prepared respectively added to the acetone solution in which the prepolymer was dissolved, and the solution was vigorously stirred at the same time. Stirred for 20 minutes and then dispersed the mixture by adding 238 g of water. 4 g of emulsifier Tween 20 was added after separating the acetone by distillation. A solvent-free polyurethane-polyurea aqueous dispersion was obtained, which has a solid content of 50 wt % and an average particle size of 185 nm as determined by laser-related measurements in the dispersed phase, and a pH of 7.2.

EXAMPLE 13

80 g of dehydrated polyester I, 150 g of dehydrated polyester II, 15 g of dehydrated polyester III, 28.35 g of isocyanate I, 2 g of dehydrated polyether I, 25 g of acetone, 0.04 g of bismuth neodecanoate were added to a 1 L four-necked round bottom flask equipped with a nitrogen inlet and a nitrogen outlet. The mixture was stirred at 80-90° C. until the NCO reached 2.03%. The prepolymer was dissolved in 415 g of acetone and cooled to 50° C. 5 g of sodium N-(2-aminoethyl)-2-aminoethanesulfonate, 3 g of isophoronediamine, 0.86 g of hydroxyethylethylenediamine dissolved in 35 g of aqueous solution, and 0.72 g of N-β-(aminoethyl)-γ-aminopropyltrimethoxysilane dissolved in 5 g of acetone solution were respectively added to the acetone solution in which the prepolymer was dissolved, and the solution was vigorously stirred at the same time. Stirred for 20 minutes and then dispersed the mixture by adding 238 g of water. 4 g of emulsifier Tween 20 was added after separating the acetone by distillation. A solvent-free polyurethane-polyurea aqueous dispersion was obtained, which has a solid content of 50 wt % and an average particle size of 178 nm as determined by laser-related measurements in the dispersed phase, and a pH of 7.0.

COMPARATIVE EXAMPLE 14

210 g of dehydrated polyester I, 28.35 g of isocyanate I, 24 g of acetone, 2 g of dehydrated polyether I, and 0.04 g of bismuth neodecanoate were added to a 1 L four-necked round bottom flask equipped with a nitrogen inlet and a nitrogen outlet. The mixture was stirred at 80-90° C. until the NCO reached 1.72%. The prepolymer was dissolved in 405 g of acetone and cooled to 50° C. 5.1 g of sodium N-(2-aminoethyl)-2-aminoethanesulfonate, 3.51 g of isophoronediamine, 0.86 g of hydroxyethylethylenediamine dissolved in 35 g of aqueous solution were added to the acetone solution in which the prepolymer was dissolved and the solution was vigorously stirred at the same time. Stirred for 20 minutes and then dispersed the mixture by adding 300 g of water. 4 g of emulsifier Tween 20 was added after separating the acetone by distillation. A solvent-free polyurethane-polyurea aqueous dispersion was obtained, which has a solid content of 50 wt % and an average particle size of 180 nm as determined by laser-related measurements in the dispersed phase, and a pH of 7.5.

Preparation of Adhesives 100 g of water dispersion and 0.05 g BYK024 (BYK) were mixed, stirred at 500 rpm for 5 minutes, then 0.2 g of Tego245 (Tego) was added, stirred for another 5 minutes, then 0.15 g of Vesmody U604 (Wanhua Chemical) was added, then stirred at 600 rpm for 10 minutes.

Preparation of Samples

Samples were prepared using the following composite materials:

| Composite materials | Substrate 1 | Substrate 2 |
|---|---|---|
| A | Rubber | Rubber |
| B | Canvas | Canvas |
| C | PVC | PVC |
| D | Rubber | Rubber |

(1) First of all, the substrate 1 (rubber) and the substrate 2 (rubber) were treated with a treating agent (acetone solution of trichloroisocyanurate, 2 wt %), and then air-dried for later use. The adhesive was first applied to a substrate strip with a width of 2.5 cm and a length of 15 cm using a brush, dried in an oven at 65° C. for 5 minutes and then taken out and pressed at 30 kg/cm² for 10 seconds to prepare composite material A.

(2) Composite material B and composite material C were prepared in the same manner as in step (1).

(3) After the adhesive was placed at 75° C. for 72 hours, the composite material D was prepared in the same manner as in step (1).

Testing the peel strength of the composite materials

The peel strength was measured using a GOTECH tensile machine at a peel rate of 200 mm/minute.

Initial strength: peel strength tested directly on the tensile machine after pressing.

Late strength: the samples were placed at room temperature for 24 hours, then their peel strength were tested.

The test results are shown in Table 1.

TABLE 1

Peel strengths of the adhesives on different substrates

| | Initial strength N/mm | | | | Late strength N/mm | | | |
|---|---|---|---|---|---|---|---|---|
| | Composite materials | | | | | | | |
| | A | B | C | D | A | B | C | D |
| Example 1 | 5.8 | 4.0 | 4.6 | 5.8 | 11.9 | 7.3 | 8.2 | 11.5 |
| Example 2 | 5.3 | 3.6 | 4.3 | 5.3 | 11.6 | 7.0 | 8.0 | 11.6 |
| Example 3 | 5.6 | 3.9 | 4.8 | 5.6 | 11.7 | 7.6 | 8.1 | 11.6 |
| Example 4 | 5.7 | 4.1 | 4.5 | 5.3 | 12.0 | 7.5 | 8.0 | 12.5 |
| Example 5 | 5.2 | 3.5 | 4.4 | 5.0 | 11.4 | 7.2 | 7.9 | 11.5 |
| Example 6 | 6.0 | 4.2 | 4.5 | 6.1 | 12.1 | 7.5 | 8.0 | 12.3 |
| Example 7 | 5.7 | 3.9 | 4.5 | 5.9 | 12.1 | 7.1 | 8.4 | 12.5 |
| Example 8 | 5.1 | 3.2 | 4.0 | 5.0 | 11.5 | 7.1 | 8.0 | 11.5 |
| Example 9 | 6.0 | 4.1 | 4.3 | 6.0 | 12.2 | 7.0 | 8.2 | 12.2 |

TABLE 1-continued

Peel strengths of the adhesives on different substrates

| | Initial strength N/mm | | | | Late strength N/mm | | | |
|---|---|---|---|---|---|---|---|---|
| | Composite materials | | | | | | | |
| | A | B | C | D | A | B | C | D |
| Example 10 | 6.2 | 4.3 | 4.2 | 6.0 | 12.6 | 6.5 | 7.4 | 12.5 |
| Example 11 | 5.6 | 4.8 | 4.5 | 5.3 | 12.8 | 7.0 | 8.0 | 12.5 |
| Example 12 | 4.8 | 4.5 | 4.0 | 4.5 | 10.9 | 6.2 | 6.9 | 10.2 |
| Example 13 | 5.2 | 4.9 | 4.8 | 5.1 | 11.5 | 6.9 | 8.1 | 11.2 |
| Comparative example 14[1] | 6.0 | 4.2 | 4.9 | 3.5 | 12.5 | 7.9 | 8.3 | 7.9 |
| Comparative example 14[2] | 6.2 | 4.4 | 4.8 | 3.2 | 12.5 | 7.8 | 8.5 | 7.8 |

Note:
[1] indicates an one-component formulation without adding a curing agent (siloxane component);
[2] indicates that when the adhesive is formulated, Aquolin ® 161 (Yantai Wanhua Chemical, with NCO of 18.5 wt %) corresponding to 5 wt % of the emulsion (the aqueous dispersion prepared in Example 14) was additionally added to prepare a two-component system.
In the above table, "example" and "comparative example" mean that the adhesives were prepared by using the aqueous dispersions prepared in the corresponding examples or comparative examples as raw materials.

As can be seen from Table 1, compared with the one/two-component adhesives based on the dispersions not containing siloxys in the side chains (comparative Examples 14(1), 14(2)), the initial strengths and the late strengths of the one-component adhesives based on the dispersions containing siloxys in the side chains provided by the present invention decreased slightly, with a very small extent of the decrease, which meet the performance requirements, and basically did not affect the normal use.

The bonding strengths of the dispersions containing siloxy segments in the side chains did not change significantly after stored at a high temperature for 3 days. But in the comparative examples, the dispersions without siloxy segments showed a significant decrease in bonding strength. This indicates that the dispersions containing siloxy segments in the side chains have excellent storage stability.

Testing the Heat Resistance of the Composite Materials

Initial heat resistance: a 500 g weight was hung on the prepared sample and the sample was places in an oven of 80° C. to measure the stretch length within 30 minutes.

Late heat resistance: the prepared sample was placed at room temperature for 3 days, then a 1 kg weight was hung on the sample, the sample was placed in an oven of 70° C. to measure the stretch length within 24 hours.

Heat and humidity resistance: the prepared sample was placed at room temperature for 3 days, then a 500 g weight was hung on the sample, the sample was placed in an oven of 70° C./95% humidity to measure the stretch length within 24 hours.

The test results are shown in Table 2.

TABLE 2

Heat resistances of adhesives on different substrates

| | Initial heat resistance/mm | | | Late heat resistance/mm | | | Heat and humidity resistance/mm | | |
|---|---|---|---|---|---|---|---|---|---|
| | Composite materials | | | | | | | | |
| | A | B | C | A | B | C | A | B | C |
| Example 1 | 2 | 2 | 1 | 0 | 0 | 0 | 30 | 60 | 42 |
| Example 2 | 4 | 6 | 3 | 1 | 2 | 1 | 56 | 75 | 49 |
| Example 3 | 6 | 8 | 5 | 3 | 5 | 4 | 78 | 102 | 62 |
| Example 4 | 1 | 2 | 1 | 1 | 0 | 0 | 35 | 52 | 48 |
| Example 5 | 5 | 5 | 6 | 2 | 1 | 0 | 62 | 71 | 53 |
| Example 6 | 1 | 2 | 2 | 0 | 0 | 0 | 32 | 53 | 41 |

TABLE 2-continued

Heat resistances of adhesives on different substrates

| | Initial heat resistance/mm | | | Late heat resistance/mm | | | Heat and humidity resistance/mm | | |
|---|---|---|---|---|---|---|---|---|---|
| | \multicolumn{9}{c}{Composite materials} | | | | | | | | |
| | A | B | C | A | B | C | A | B | C |
| Example 7 | 1 | 1 | 2 | 0 | 1 | 0 | 36 | 56 | 39 |
| Example 8 | 5 | 7 | 5 | 2 | 3 | 1 | 62 | 71 | 55 |
| Example 9 | 1 | 1 | 1 | 1 | 0 | 1 | 36 | 52 | 51 |
| Example 10 | 1 | 2 | 1 | 0 | 1 | 1 | 45 | 71 | 48 |
| Example 11 | 1 | 1 | 2 | 1 | 0 | 0 | 49 | 35 | 59 |
| Example 12 | 1 | 2 | 7 | 1 | 0 | 0 | 45 | 38 | 42 |
| Example 13 | 1 | 4 | 5 | 1 | 0 | 0 | 53 | 42 | 55 |
| Comparative example 14[(1)] | 50 | 46 | 38 | 61 | 58 | 53 | 150 | 150 | 150 |
| Comparative example 14[(2)] | 20 | 18 | 15 | 0 | 0 | 0 | 20 | 25 | 12 |

Note:
[(1)]indicates an one-component formulation without adding a curing agent;
[(2)]indicates that when the adhesive is formulated, Aquolin ® 161 (Yantai Wanhua Chemical, with NCO of 18.5 wt %) corresponding to 5 wt % of the emulsion was additionally added to prepare a two-component system.
In the above table, "example" and "comparative example" mean that the adhesives were prepared by using the aqueous dispersions prepared in the corresponding examples or comparative examples as raw materials.

As can be seen from Table 2, compared with the one-component adhesive based on the dispersion not containing siloxys in the side chains (comparative Examples 14(1)), the initial heat resistance, the late heat resistance and the heat and humidity resistance of the one-component adhesives based on the dispersions containing siloxys in the side chains provided by the present invention increased significantly, the initial heat resistances were obviously superior to the performance of the two-component adhesive (comparative example 14(2)), and the late heat resistances were close to the performance of the two-component adhesive (comparative example 14(2)). This is mainly because the siloxys in the side chains are hydrolyzed and crosslinked with each other to increase a cross-linking density of the coating film, improving the heat resistance and heat and humidity resistance of the coating film remarkably.

The invention claimed is:

1. A polyurethane or polyurethane-urea aqueous dispersion, wherein the polyurethane or polyurethane-urea aqueous dispersion is a reaction product obtained by reacting a composition comprising the following components:
    a) at least one silane component having a general formula of

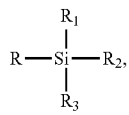

wherein group R contains at least two NCO-reactive groups, wherein at least two of groups $R_1$, $R_2$ and $R_3$ are methoxyls and/or ethoxyls, and the remaining groups $R_1$, $R_2$ and/or $R_3$ is an alkyl;
    b) at least one polyol component having a functionality of 2-4, wherein the component b) comprises a mixture of a crystalline polyol having a number average molecular weight of 400-15,000 and at least one non-crystalline polyol having a number average molecular weight of 400-15,000;
    c) at least one polyisocyanate component;
    d) at least one hydrophilic compound component, the hydrophilic group of the hydrophilic compound comprises one or two of an ionic group and a potentially ionic group, the hydrophilic compound contains 2-3 NCO-reactive groups;
    e) at least one NCO-reactive, monofunctional nonionic hydrophilic compound component; and
    f) optionally, a compound containing 1-3 aminos and/or hydroxys in the molecule; and
    g) optionally, other isocyanate-reactive compounds.

2. The aqueous dispersion according to claim 1, wherein based on the total weight of the composition, the component a) is used in an amount of 0.02-5 wt %; the component b) is used in an amount of 30-94 wt %; the component c) is used in an amount of 5-40 wt %; the component d) is used in an amount of 0.2-10 wt %; the component e) is used in an amount of 0.01-10 wt %; the component f) is used in an amount of 0-10 wt %; the component g) is used in an amount of 0-15 wt %.

3. The aqueous dispersion according to claim 1, wherein the NCO-reactive functional group of component a), the silane component is selected from the group consisting of hydroxy, primary aminos, secondary aminos and combinations thereof.

4. The aqueous dispersion according to claim 1, wherein component b) has a number average molecular weight of 20-15,000.

5. The aqueous dispersion according to claim 1, wherein component b) comprises a mixture of a crystalline diol having a number average molecular weight of 1,000-4,000 and a non-crystalline diol having a number average molecular weight of 1,000-4,000.

6. The aqueous dispersion according to claim 5, wherein the weight ratio of the crystalline diol to the non-crystalline diol is 1-25:1.

7. The aqueous dispersion according to claim 1, wherein the hydrophilic compound containing an ionic group or a potentially ionic group in the component d) comprises a component selected from the group consisting of dimethylolpropionic acid, dimethylolbutanoic acid, dimethylol acetic acid, dihydroxysuccinic acid, N-(2-aminoethyl)-2-aminoethanesulfonic acid, N-(3-aminopropyl)-2-aminoethanesulfonic acid, N-(3-aminopropyl)-3-aminopropanesulfonic acid, N-(2-aminoethyl)-3-aminopropanesulfonic acid and alkali metal salts, alkaline earth metal salts and ammonium salts thereof and combinations thereof.

8. The aqueous dispersion according to claim 1, wherein component e) has an ethylene oxide number of 4-200.

9. The aqueous dispersion according to claim 1, wherein the component f) is a compound containing 2-3 NCO-reactive functional groups, wherein at least one of the NCO-reactive functional groups is a primary amino or a secondary amino.

10. A method for preparing the aqueous dispersion as defined in claim 1, comprising the following steps: components b), c), d), e) and optionally g) react through a one-step or multi-step reaction to form a prepolymer with a terminal isocyanate, then the prepolymer reacts with component a) and optional f) through a one- or two-stage reaction, followed by water dispersion or dissolution, wherein a solvent which can be partially or completely removed by distillation during or after the dispersion is optionally used.

11. The aqueous dispersion according to claim 1, wherein the polyisocyanate component c) is a mixture of hexamethylene diisocyanate and isophorone diisocyanate with a weight ratio of 1-50:1 or a mixture of hexamethylene diisocyanate and 4,4'-dicyclohexylmethane diisocyanate with a weight ratio of 1-50:1, and the ionic group is carboxylate and/or sulfonate; the potentially ionic group is carboxyl and/or sulfonic group; and the NCO-reactive group is hydroxy and/or amino.

12. The aqueous dispersion according to claim 2, wherein based on the total weight of the composition, the component a) is used in an amount of 0.2-2.5 wt %; the component b) is used in an amount of 70-90 wt %; the component c) is used in an amount of 8-20 wt %; the component d) is used in an amount of 1-5 wt %; the component e) is used in an amount of 0.5-3 wt %; the component f) is used in an amount of 0.5-3 wt %; the component g) is used in an amount of 1-8 wt %.

13. The aqueous dispersion according to claim 3, wherein component a) is a silane having at least two primary aminos and/or secondary aminos.

14. The aqueous dispersion according to claim 3, wherein component a) is selected from the group consisting of N-β-(aminoethyl)-γ-aminopropyltrimethoxy silane, N-β-(aminoethyl)-γ-aminopropyltriethoxy silane and N-(β-aminoethyl)-γ-aminopropylmethyldimethoxy silane and combinations thereof.

15. The aqueous dispersion according to claim 4, wherein component b) comprises a component selected from the group consisting of a polyester polyol, a polycarbonate polyol, a polylactone polyol having a number average molecular weight of 500-5,000 and a functionality of 2-3, a small molecular alcohol having a number average molecular weight of 80-400 and a functionality of 2-4 and combination thereof.

16. The aqueous dispersion according to claim 5, wherein the non-crystalline diol is a polycarbonate diol prepared by the reaction of a component with dimethyl carbonate and/or diethyl carbonate, wherein the component is selected from the group consisting of 1,4-butanediol, 1,5-pentanediol, 1,6-hexanediol, neopentyl glycol and combinations thereof; the crystalline diol is a polyester glycol prepared by the reaction of a component and adipic acid, wherein the component is selected from the group consisting of 1,4-butanediol, 1,6-hexanediol and combinations thereof.

17. The aqueous dispersion according to claim 6, wherein the weight ratio of the crystalline diol to the non-crystalline diol is 5-10:1.

18. The aqueous dispersion according to claim 8, wherein component e) is a monofunctional polyethoxy ether having a number average molecular weight of 200-8,000 and an ethylene oxide number of 4-200.

19. The aqueous dispersion according to claim 8, wherein component e) is a methoxy polyethylene glycol having a number average molecular weight of 500-3,000 and an ethylene oxide number of 12-75.

20. The aqueous dispersion according to claim 9, wherein the component f) is a mixture of isophoronediamine and N-(2-hydroxyethyl)ethylenediamine with a molar ratio of 0.5-10:1.

* * * * *